Figure 1:
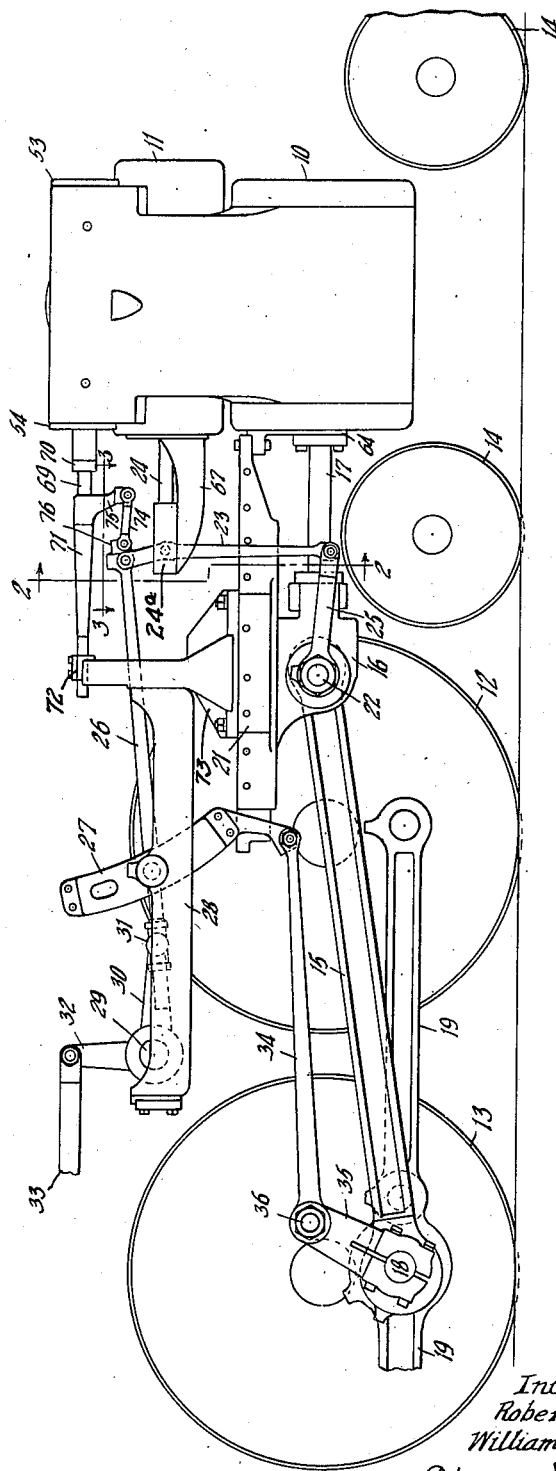

April 19, 1949.                R. R. ROYAL ET AL                2,467,598
                        VALVE MECHANISM FOR STEAM LOCOMOTIVES
Filed June 30, 1944                                          8 Sheets-Sheet 1

Inventors
Robert R. Royal
William E. Bell
BY Henry Fuchs.
         Atty.

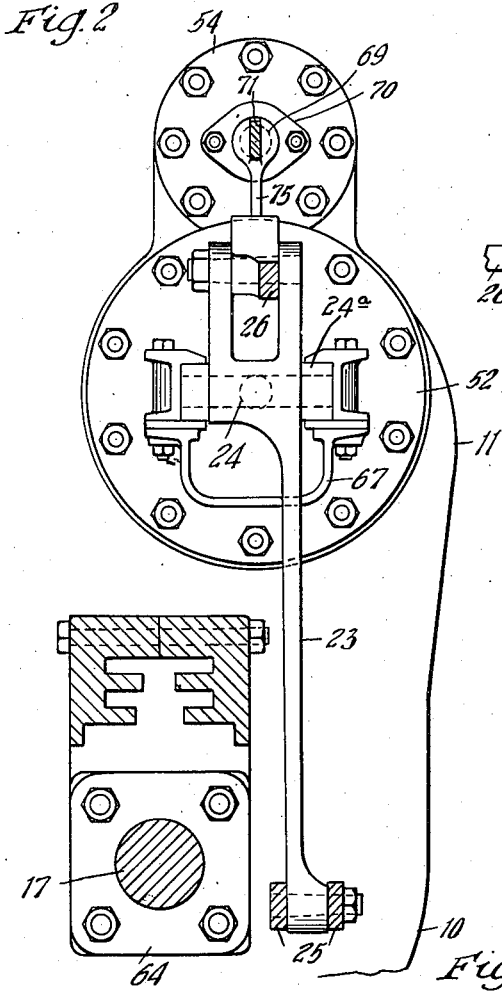
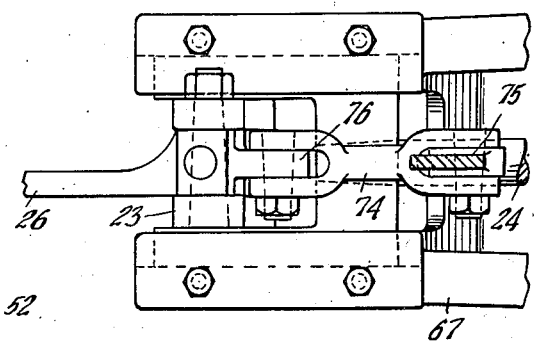
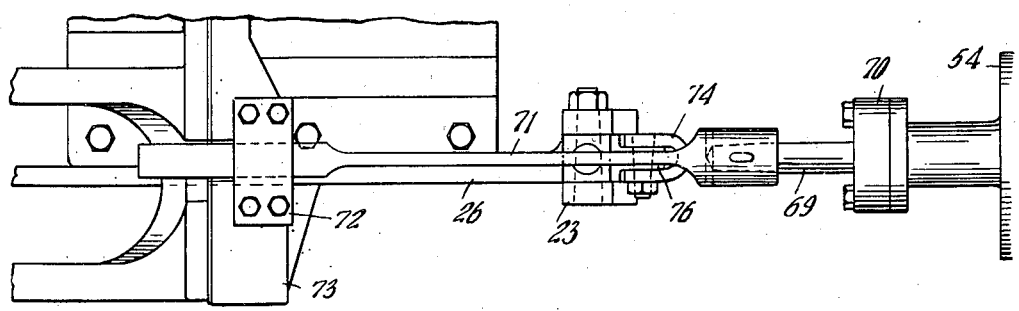

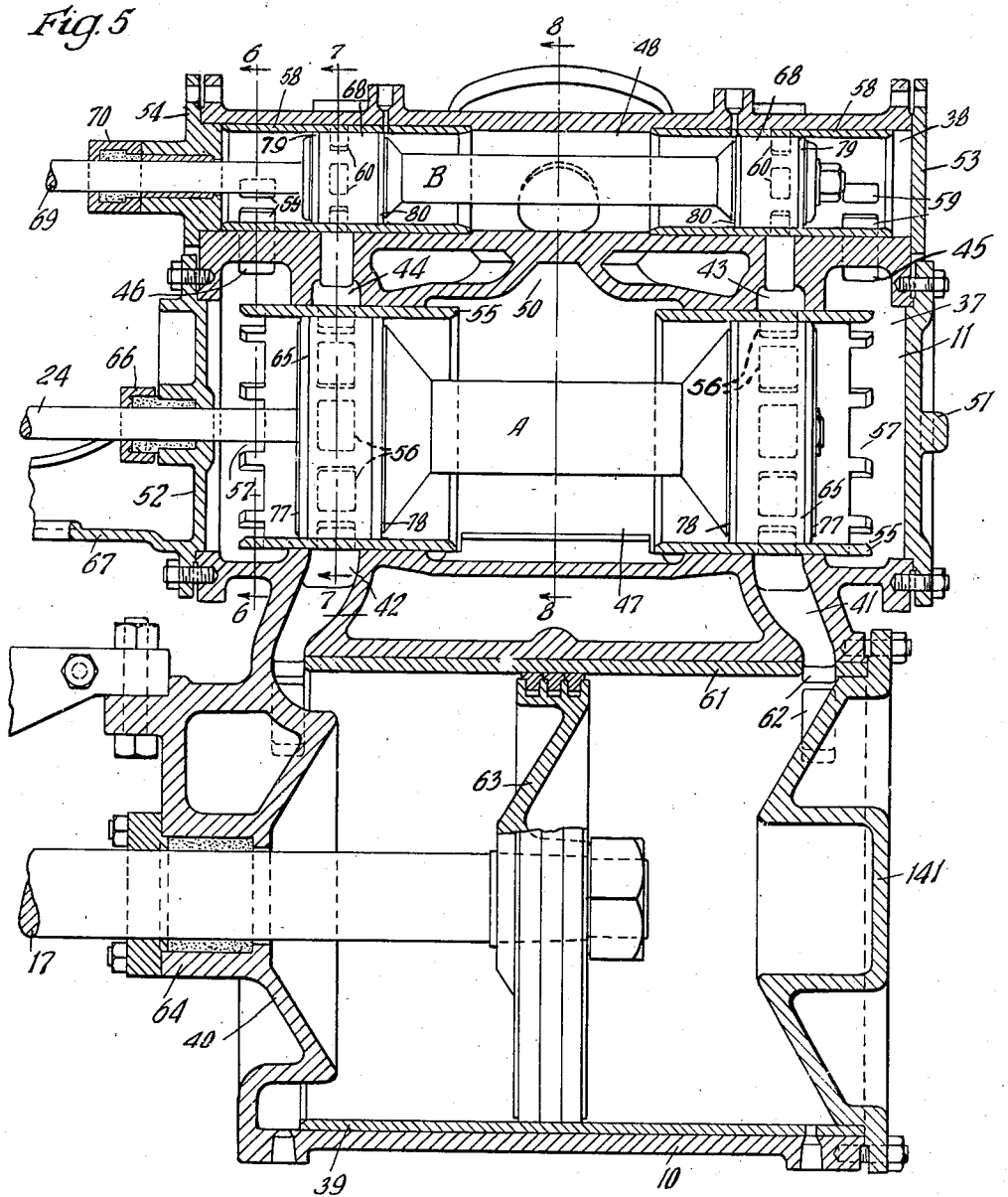

April 19, 1949.  R. R. ROYAL ET AL  2,467,598
VALVE MECHANISM FOR STEAM LOCOMOTIVES
Filed June 30, 1944  8 Sheets-Sheet 4
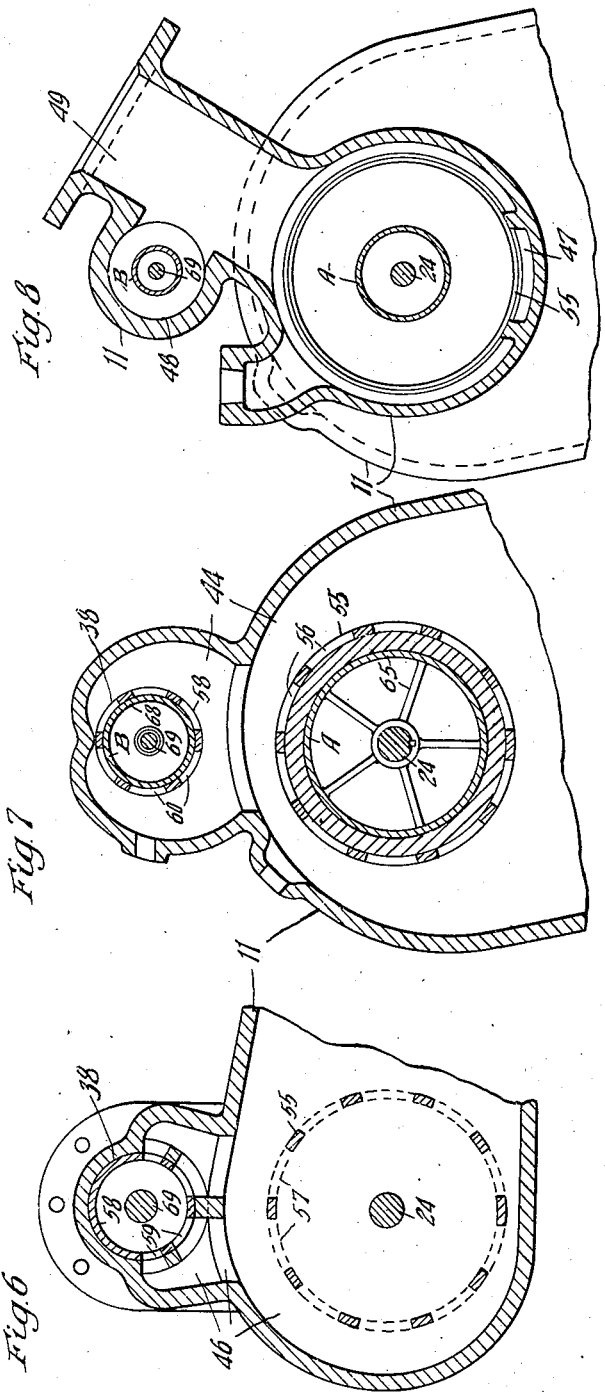
Inventors
Robert R. Royal
William E. Bell
By Henry Fuchs
Atty.

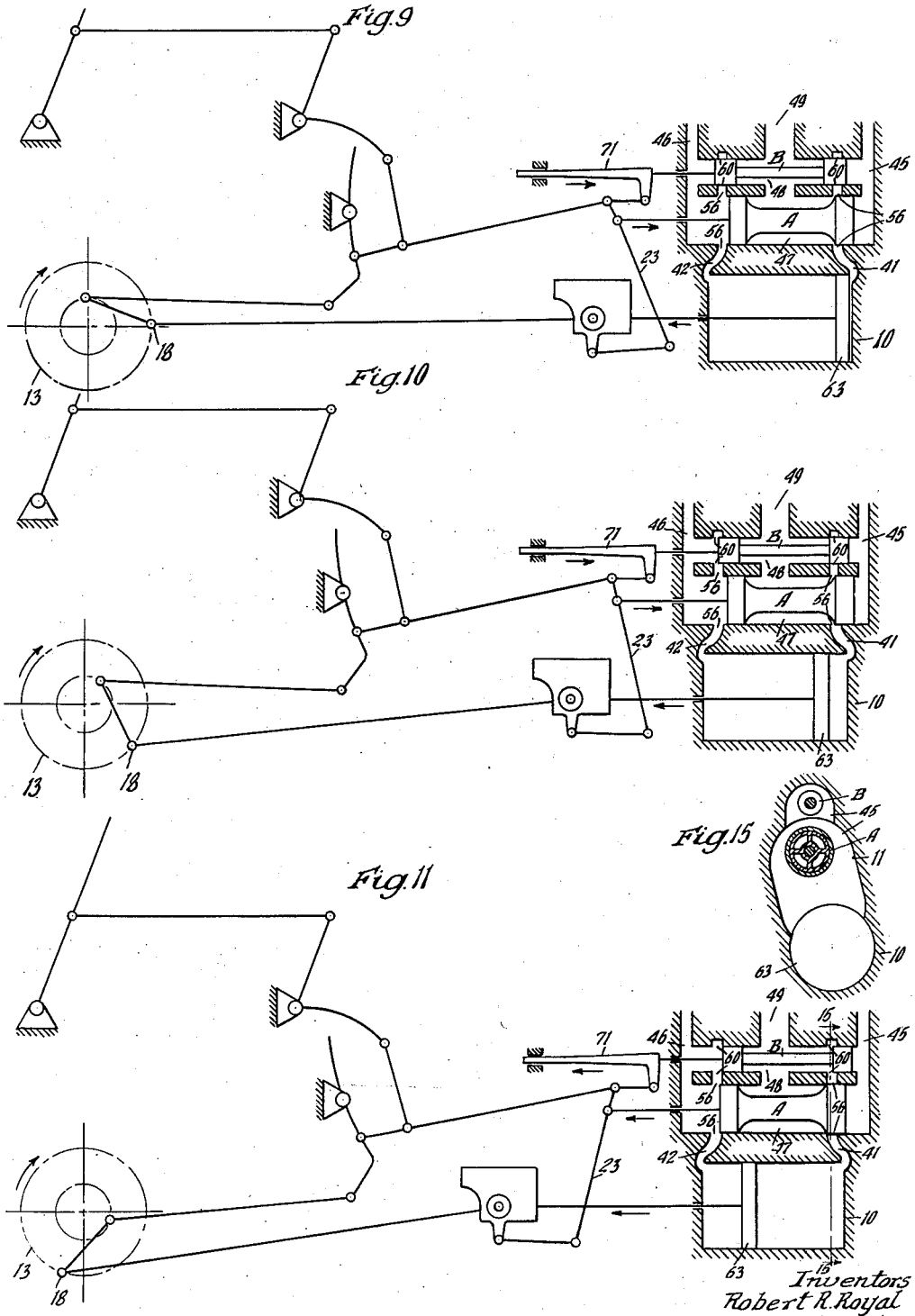

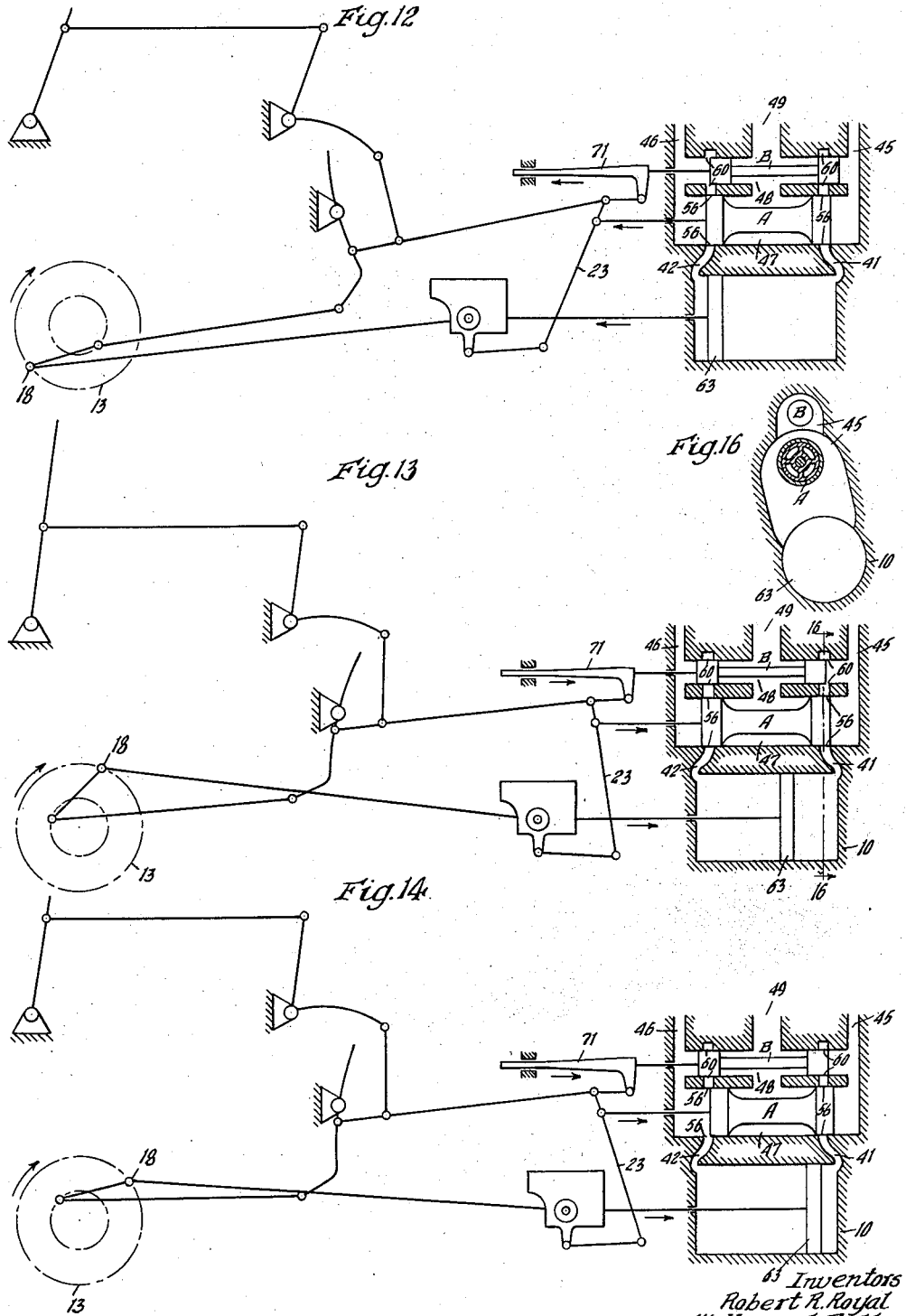

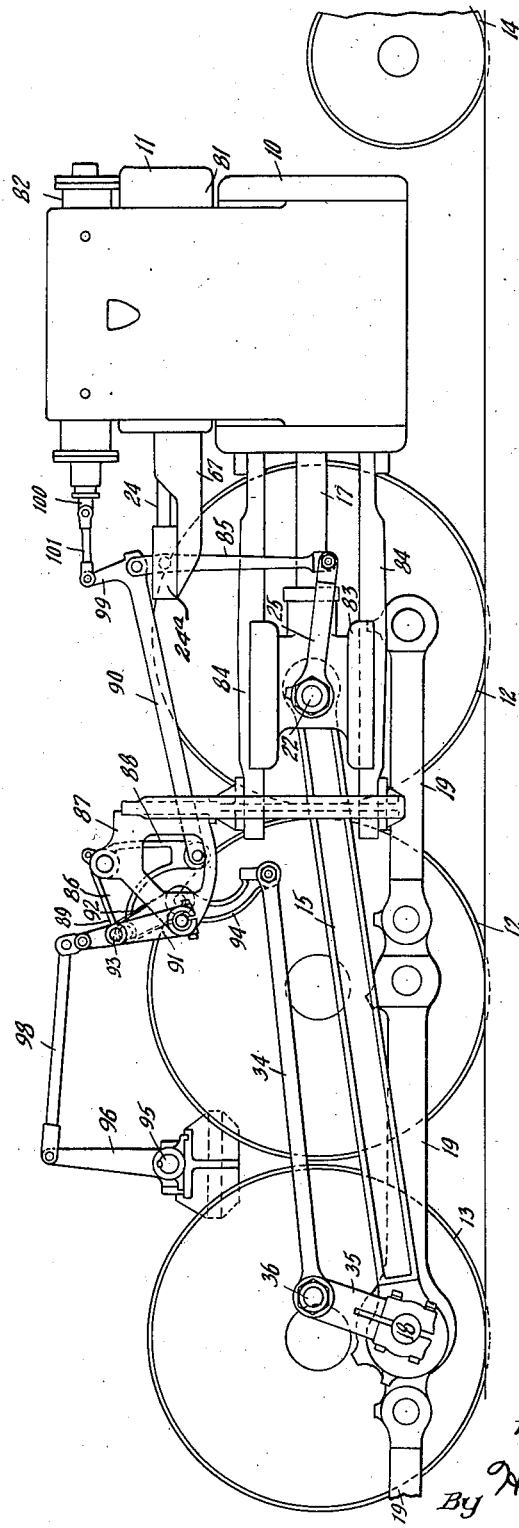

April 19, 1949.  R. R. ROYAL ET AL  2,467,598
VALVE MECHANISM FOR STEAM LOCOMOTIVES
Filed June 30, 1944  8 Sheets-Sheet 8

Inventors
Robert R. Royal
William E. Bell
By Henry Fuchs
Atty.

Patented Apr. 19, 1949

2,467,598

UNITED STATES PATENT OFFICE 2,467,598

VALVE MECHANISM FOR STEAM LOCOMOTIVES

Robert R. Royal and William E. Bell, Paducah, Ky.

Application June 30, 1944, Serial No. 542,990

24 Claims. (Cl. 121—142)

This invention relates to improvements in valve mechanism for steam locomotives, and more particularly to the valve mechanism thereof.

As is well known in railway practice, the usual steam locomotive is provided with a slide valve, which may be of the piston type, for each engine cylinder of a locomotive to accomplish the desired distribution of steam to the cylinders. The piston valve is actuated by a suitable valve gear, which is one of several well-known types, as for example, the Walschaert, Baker, etc. This arrangement is simple, easy to maintain, and reasonably effective. Steam can be admitted throughout most of the piston stroke where the maximum tractive force is needed, as in starting or when heavy grades are encountered. On level track, after the train has been brought up to speed, the valve gear may be adjusted by means of the usual reverse lever to admit steam through only a portion of the piston stroke, allowing it to expand during the rest of the stroke, thereby economizing in consumption of both fuel and water. This single distribution valve arrangement was quite satisfactory when freight train speeds were low and passenger trains were light in weight; however, the practice in recent years to increase greatly freight and passenger train speeds with no reduction in train weight has correspondingly multiplied fuel consumption, and a valve arrangement which effects greater economy is in great demand to satisfy the requirements of modern transportation. It has been found that by so designing the single distribution valve that steam is admitted through a lesser portion of the piston stroke by increasing the steam lap of the valve, its action is greatly improved, both as to admission of steam and exhaust of the expanded steam, thereby effecting a material economy in fuel consumption; however, with the result that the starting action of the locomotive is greatly impaired due to consequent unavoidable reduction of the steam admission period of the valve, which renders the starting action sluggish, if not making the same impossible, and also reducing the ability of the locomotive, in the case of freight trains, to ascend heavy grades. Various attempts have been made by others to augment the starting effect of locomotives to overcome this deficiency in single distribution valves, but the mechanism employed has been found to be unsatisfactory, being too complicated for practical purposes. To overcome the defects pointed out and yet provide a simple, efficient, and practical device, we have found that the solution of the problem lies in the provision of two distribution valves for each engine cylinder, each having direct communication with the cylinder.

The main object of this invention is to provide in a locomotive a steam distribution valve mechanism for effecting easy starting of the locomotive by prolonging the admission of steam to the engine cylinders during the strokes of the pistons and for effecting substantial reduction of the back pressure during exhaust at high speeds by increasing the area of exhaust port opening, and for effecting also a reduction in compression by extending the period of exhaust opening.

Another object of the invention is to provide a steam distribution valve mechanism for locomotives comprising main and auxiliary distribution valves, both of which serve to directly admit and directly exhaust the steam to and from the engine cylinders, thereby greatly increasing the efficiency of the locomotive.

A further object of the invention is to provide in a locomotive a steam distribution valve mechanism driven from the engine crank shaft and including an auxiliary distribution valve independent of the main distribution valve, providing increased steam port opening at shorter cut-offs, longer expansion, increased exhaust port opening, and later exhaust closure than is had in locomotives provided with the usual single distribution slide valve arrangement.

A still further object of the invention is to provide a steam distribution valve mechanism comprising a main slide valve and an auxiliary slide valve for each engine cylinder of a locomotive, each communicating directly with the engine cylinder, and both controlled by the usual engine valve gear, wherein the main valve has long steam lap effecting an earlier cut-off than would be had with a shorter steam lap, and the auxiliary valve has a late cut-off so as to be open for admission of steam to the engine cylinder after the main valve is closed to provide for easy starting, and wherein the travel of the auxiliary valve is reduced to an extent insufficient to admit any steam to the engine cylinder, which would interfere with the proper efficient operation of the locomotive when the valve gearing is adjusted for early cut-off of the main valve for high locomotive speeds.

Yet another object of the invention is to provide a steam distribution valve mechanism as set forth in the preceding paragraph, wherein both the auxiliary and main valves are designed to exhaust, as well as admit steam, the exhaust action of the auxiliary valve during all stages of cut-off of the valves continuing after the main valve is closed, thereby reducing compression in the engine and increasing the power and efficiency of the locomotive.

A more specific object of the invention is to provide a steam distribution valve mechanism for locomotives, comprising a main and an auxiliary reciprocating slide valve of the piston type for each engine cylinder, main and auxiliary valve chambers for said valves, each having steam ports communicating directly with the steam passages leading to the engine cylinder, said main valve being actuated by the motion transmitting means of the usual locomotive valve gearing, and said auxiliary valve having operative connection with said motion transmitting means of the main valve to be actuated in timed relation with said main valve, wherein the latter has relatively great steam lap, thereby increasing the efficiency of the locomotive at high speed and the auxiliary valve has its steam and exhaust lap so proportioned that at low locomotive speeds, that is, in starting, it continues to admit steam after the main valve has cut off the steam to give more power to the stroke of the piston, and at high locomotive speeds admits no steam to the engine cylinder but prolongs exhaust of the steam after the exhaust port of the main distribution valve is closed, reducing back pressure and also the final pressure at the end of compression.

Other objects of the invention will more clearly appear from the description and claims hereinafter following.

Figure 18:
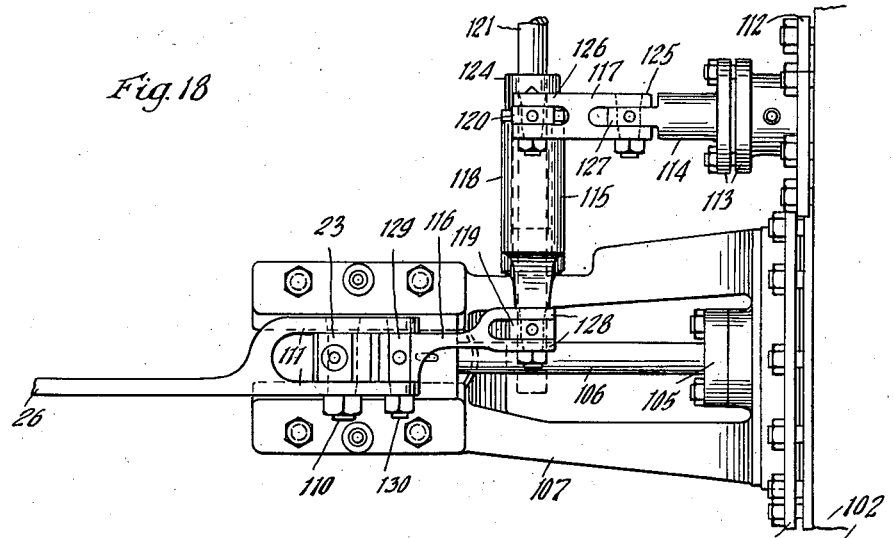
Figure 19:
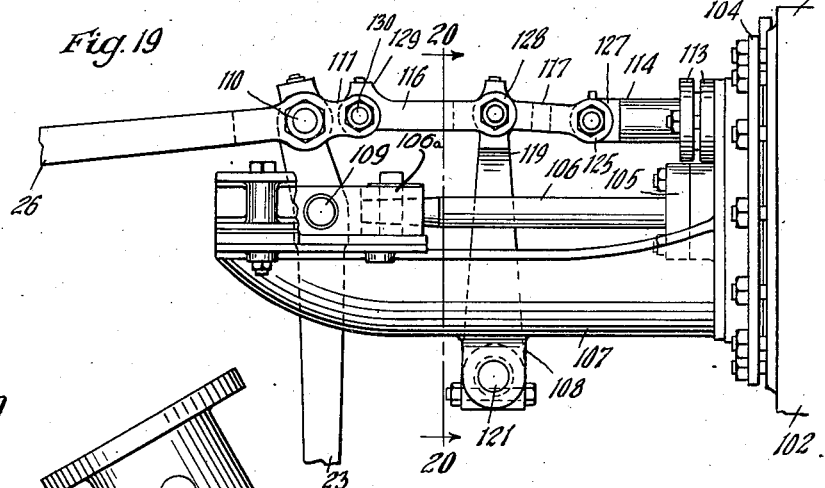
Figure 20:
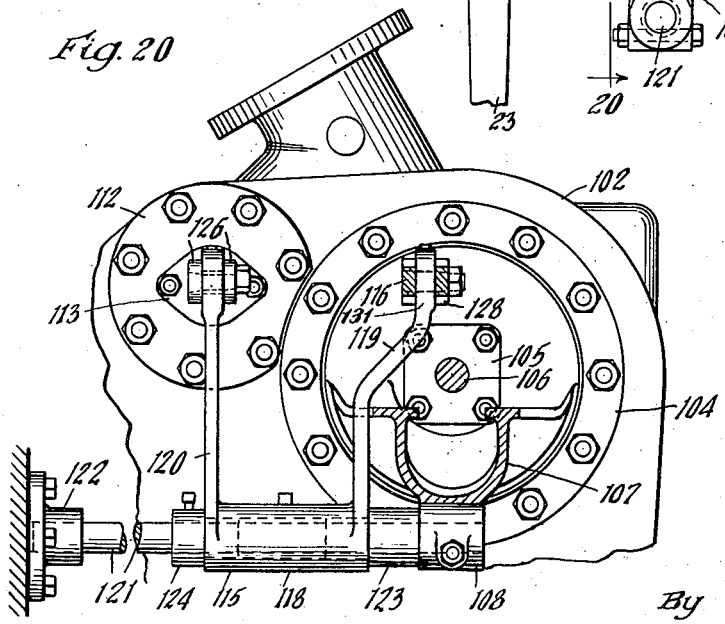

In the drawing forming a part of this specification, Figure 1 is a side elevational view of a portion of a locomotive, illustrating our improvements in connection therewith. Figure 2 is a transverse, vertical sectional view, on an enlarged scale, corresponding substantially to the line 2—2 of Figure 1. Figure 3 is a horizontal sectional view, corresponding substantially to the line 3—3 of Figure 1, said view being partly broken away and the steam chest and engine cylinder being omitted. Figure 4 is a top plan view of Figure 1, showing the mechanism immediately to the rear of the piston cylinder and valve chambers of the locomotive, said view being partly broken away. Figure 5 is a central, longitudinal, vertical sectional view, on an enlarged scale, through the piston cylinder and valve chambers of the locomotive illustrated in Figures 1, 2, 3, and 4, said view being partly broken away and showing certain parts in elevation. Figures 6, 7, and 8 are transverse, vertical sectional views, corresponding respectively to the lines 6—6, 7—7, and 8—8 of Figure 5. Figures 9, 10, 11, 12, 13, and 14 are diagrammatic views, graphically illustrating the operation of our improved valve mechanism. Figure 15 is a vertical sectional view, corresponding substantially to the line 15—16 of Figure 13. Figure 17 is a view, similar to view, corresponding substantially to the line 16—15 of Figure 11. Figure 16 is a vertical sectional Figure 1, illustrating another embodiment of the invention. Figure 18 is a top plan view of the mechanism immediately to the rear of the cylinder and valve chambers at one side of the locomotive, illustrating still another embodiment of the invention, certain parts being broken away. Figure 19 is a side elevational view of Figure 18. Figure 20 is a transverse vertical sectional view, corresponding substantially to the line 20—20 of Figure 19.

In said drawings, referring first to the embodiment of the invention illustrated in Figures 1 to 16 inclusive, 10 indicates one of the steam cylinders of the locomotive and 11 the steam chest, the cylinder and chest being enclosed in the usual protective casing. The driving wheels are indicated by 12 and 13, and the leading truck wheels by 14—14. As shown most clearly in Figure 1, the driving wheels 12 and 13 are driven in the usual manner by the main rod 15 connected at its front end to the crosshead 16, actuated by the piston rod 17 and connected at its rear end to the main crank pin 18 of the driving wheel 13. The driving wheels of the locomotive are connected to each other by the usual side rods 19—19, which are connected at opposite ends to the driving wheels, in a manner well understood by those skilled in this art. The crosshead 16 is slidingly guided in a crosshead guide 21 of well-known design and is provided with the usual wrist pin 22 on which the front end of the main rod 15 is journaled.

In the embodiment of the invention illustrated in Figures 1 to 16 inclusive, our improved mechanism is employed in connection with the well-known "Walschaert" arrangement of valve gearing, although, as will be evident, the same, with slight modification, is equally adapted to other types of valve gearing, such as for example, the "Baker" as hereinafter pointed out.

As shown most clearly in Figure 1, the "Walschaert" arrangement of valve gearing, as illustrated, comprises the following well-known elements: A combination lever 23 pivotally connected between its ends to the valve stem 24 of the main distributing valve of the locomotive; a union link 25 pivoted at its front end to the lower end of the lever 23 and journaled at its rear end on the wrist pin 22 of the crosshead 16; a radius rod 26 pivotally connected at its front end to the upper end of the combination lever 23; a reverse link 27 swingingly mounted on the valve gear frame 28, and with which the rear end of the radius rod has sliding connection; a reverse shaft 29 journaled in the frame 28; a reverse shaft arm 30 radially extending from the shaft 29; a lifting link 31 pivotally connected at opposite ends to the reverse shaft arm 30 and the radius rod 26; a second reverse shaft arm 32 radially extending from the shaft 29; a reach rod 33 pivotally connected to the outer end of the arm 32 to actuate the reverse shaft 29 to lift or lower the rear end of the radius rod 26 with respect to the reverse link 27; an eccentric rod 34 pivotally connected at its front end to the lower end of the reverse link 27 to effect swinging movement of the latter; and an eccentric crank 35 fixed at its inner end to the main crank pin 18 of the drive wheel 13 and rotatably connected at its outer end to the rear end of the eccentric rod 34 by means of a pin 36.

Our improvements as illustrated in Figures 1 to 16 inclusive comprise broadly main steam and auxiliary steam distribution slide valves A and B of the piston type, having direct independent communication with the steam cylinder of the engine and both driven from the usual locomotive valve gearing.

In carrying out our invention, as illustrated in Figures 1 to 16 inclusive, the auxiliary distributing valve B is made of smaller size than the main distributing valve and is located immediately above the main distributing valve A, the latter, as usual, being arranged above the steam cylinder 10. The steam cylinder 10 and the steam chest 11, which includes the valve chamber 37 of the main valve A and the valve chamber 38 of the auxiliary valve B, are preferably cast integral, that is, combined in one casting, although the steam chest comprising the valve chamber 38 for the auxiliary distributing valve B may be made in the form of a separate member or casting secured in any suitable manner to the top of the usual steam chest of the locomotive, being preferably welded thereto.

The combined casting comprising the steam cylinder 10 and the steam chest 11 has a substantially cylindrical lower portion, which forms the steam cylinder. The cylinder 10 has a bore of substantially cylindrical, interior cross section, as indicated at 39. The cylinder 10 is closed at its front and rear ends, at the rear end by a transverse wall 40, which is an integral part of the combined cylinder and steam chest casting and forms the rear head of the cylinder 10, and at the front end by the usual cylinder head 141. The combined cylinder and steam chest casting is provided with cored openings at the front and rear ends of the cylinder 10, which form front and rear steam passages 41 and 42 between the steam chest 11 and the front and rear ends of the cylinder. The steam chest portion 11 of the combined casting, which includes the main valve chamber 37 and the auxiliary valve chamber 38 is interiorly channeled or cored, thereby providing front and rear steam passages 43 and 44, and front and rear exhaust passages 45 and 46. As shown most clearly in Figures 6 and 7, the steam passage 44 completely surrounds the main valve chamber 37 and also substantially surrounds the auxiliary valve chamber 38, and the portions thereof which surround these chambers directly communicate with each other, thus forming one continuous passage. The passage 43 at the front end of the steam chest is identical with the passage 44, and the two passages 43 and 44 are respectively continuous with the passages 41 and 42 which communicate with the steam cylinder 10. As shown in Figure 6, the exhaust passage 46 completely surrounds the main valve chamber 37 and partly surrounds the auxiliary valve chamber 38, being located below and at the sides of said last named chamber. The portions of the passage 46 which surround the valve chamber 37 and partly surround the valve chamber 38 directly communicate with each other, thus forming a continuous passage. The exhaust passage 45 at the front end of the steam chest is identical with the passage 46 and the two passages 45 and 46 open into the exhaust pipe of the locomotive in the usual manner to discharge the exhaust steam to the atmosphere.

The valve chamber openings 37 and 38 of the steam chest portion 11 of the combined casting, at the mid portion thereof, that is, midway between the front and rear ends, provide live steam passages 47 and 48 which are continuous with the live steam passage 49 formed by the usual cored portion of the steam chest which communicates with the live steam pipes leading from the locomotive boiler. The interior wall of the valve chamber 37, at the live steam passage 47 thereof, is enlarged or channeled at the mid portion thereof, as indicated at 50. The valve chamber 37 is closed at the front and rear ends by heads 51 and 52 and the valve chamber 38 is closed at its front and rear ends by heads 53 and 54.

Front and rear, tubular, cylindrical bushings 55—55 line the interior of the valve chamber 37, each bushing being provided with an annular series of openings or ports 56, the ports 56 of the front bushing communicating with the steam passage 43 and those of the rear bushing communicating with the rear steam passage 44. As most clearly shown in Figure 5, the bushings 55—55 have their outer ends notched, as indicated at 57, and said outer ends are spaced inwardly from the valve chamber heads of the chamber 37 to provide free passage of the steam. The inner ends of the bushings 55—55 are spaced widely apart, as shown, extending only a slight distance into the live steam passage 47. Front and rear, tubular, cylindrical bushings 58—58, similar to the bushings 55—55, line the interior of the valve chamber 38. Each bushing 58 has a set of port openings 59 at the outer end thereof arranged in annular series, and a second set of port openings 60 arranged in annular series and spaced inwardly from the port openings 59. As shown, the ports 59 are of greater size than the ports 60. The ports 59 of the front bushing 58 communicate with the exhaust passage 45 and those of the rear bushing 58 communicate with the exhaust passage 46 of the steam chest, and the ports 60 of the front bushing 58 communicate with the steam passage 43, and those of the rear bushing 58 communicate with the steam passage 44 of the steam chest.

The steam cylinder 10 is provided with the usual tubular, cylindrical bushing 61 lining the interior of the same, this bushing being provided with ports 62 at the front and rear ends thereof which communicate respectively with the steam passages 41 and 42.

The usual Z type of piston 63 is slidable in the cylinder and is fixedly connected to the piston rod 17 hereinbefore described. The piston rod 17 of the locomotive extends through a stuffing box 64 in the cylinder head wall 40. The main distributing valve A, which is slidingly mounted in the main valve chamber 37, is of the piston type and is preferably in the form of a spool-shaped sleeve having cylindrical enlargements 65—65 at the front and rear ends thereof cooperating with the front and rear valve ports 56—56, respectively. The valve A is fixed to the valve stem 24, hereinbefore described, and is reciprocated thereby. The valve stem 24 extends through the stuffing box 66 of the rear valve chamber head 52 and has the usual crosshead at its rear end . The crosshead is guided on a valve guide bracket 67 extending from and formed integral with the valve chamber head 52. The valve stem 24 receives its motion from the combination lever 23, as hereinafter pointed out.

The auxiliary distributing valve B is slidably mounted in the valve chamber 38 and is also of the piston type, being in the form of a spool-shaped member having cylindrical enlargements 68—68 at the front and rear ends cooperating with the front and rear steam ports 60 of the valve chamber 38.

The piston valve B is fixed to the valve stem 69 by which it is reciprocated. The valve stem 69 extends through a stuffing box 70 provided in the head 54 of the valve chamber 38 and has its rear end fixed in a socket provided at the front end of a slide bar 71 which has its outer end guided for horizontal sliding movement in a bearing member 72 fixed to the top of an upstanding pedestal of the crosshead guide bracket 73. The bar 71 is, in effect, a continuation of the valve stem 69, being preferably keyed thereto. Motion is imparted to the valve stem 69 from the radius rod 26, which is pivotally connected to the upper end of the combination lever 23, the rod 26 being extended forwardly beyond the pivotal connection thereof, and connected to the slide bar 71 by a link 74. The link 74 is forked at opposite ends and pivotally connected at its front end to a depending arm 75 on the bar 71, the fork at the front end of the link embracing said arm and being connected thereto by a pivot pin. The depending arm 75 is at the socket end of the bar 71 and is preferably formed integral therewith. The rear end of the link 74 is pivotally connected to the extended portion of the radius rod 26, which extended portion is indicated by 76, the fork at the rear end of the link 74 embracing said extended portion of the bar and being secured thereto by a pivot pin extending through the arms of the fork and said extended portion 76 of the bar.

As will be evident, the valve stem 69 and the auxiliary valve B actuated thereby have substantially the same amount of reciprocating motion as the radius rod 26.

The positions of the piston 63, the main distributing valve A, and the auxiliary distributing valve B, as shown in Figure 5, are those assumed when the main drive rod 15 and the parts of the valve gearing are in the position shown in Figure 1, that is, when the main crank pin 18 has advanced through an angle of almost 90 degrees from approximately horizontal alignment with the center of rotation of the driving wheel 13, that is, from front dead center position to a position below said center of rotation, and the reverse shaft 29 is set so that the connection of the radius rod 26 with the reverse link 27, that is, the inner end of said rod, is at the point of its travel midway between the ends of the guideway of the link, or what may be termed at center and in a position where no movement is imparted to the radius rod by the operation of the eccentric crank 35. As illustrated in Figure 5, the piston 63, the main valve A, and the auxiliary valve B are all at the mid point of their travel. As is evident, the enlargements 65—65 at opposite ends of the spool-shaped piston valve A form steam and port controlling portions, the outer end edges 77—77 of the enlargements 65—65 controlling the exhaust of steam from the cylinder 10 and the inner end edges 78—78 of said enlargements controlling the admission of steam to the cylinder. The steam lap of the valve A, as shown in Figure 5, is greater than that commonly employed in railway practice, being preferably about 2 inches or more, and the maximum exhaust lap thereof is preferably from ¼ inch to ½ inch. The additional steam lap serves to increase the horse power, the area of steam admission being increased and the loss of pressure caused by wire drawing being reduced. Also the area for exhaustion of steam is increased, reducing the horse power loss, caused by back pressure in the cylinders. With an exhaust lap of ¼ inch to ½ inch, the exhaust opening of the valve, at the shorter cut-offs, has been found to exceed that of the usual valves having a moderate amount of steam lap and zero exhaust lap.

By the provision of the auxiliary distributing valve B, which admits and exhausts steam independently of the main distributing valve A, advantage may be taken of the long steam lap of the main valve without impairing the operation of the locomotive at low speeds and in starting, the valve B being employed to increase the length of the steam admission period at low speeds and to increase also the exhaust period, especially at high speeds and short cut-offs, thereby reducing objectionable excessive compression.

The enlargements 68—68 at opposite ends of the spool-shaped piston valve B form steam and port controlling portions, the outer end edges 79—79 of the front and rear enlargements 68—68 controlling the exhaust of steam from the cylinder 10, and the inner end edges 80—80 of said enlargements controlling the admission of steam to the cylinder. As shown in Figure 5, the valve B has both steam and exhaust lap, the steam lap being quite great. The valve B, as hereinbefore pointed out, is actuated from the radius rod 26 of the valve gearing, which rod also controls the operation of the valve A. The valves A and B are so proportioned and designed that the valve B admits steam to the cylinder 10 only at the longer cut-offs used ordinarily at relatively low locomotive speeds, prolonging the admission after the main valve A has closed the steam port 56 for steam admission, keeps the ports 60—60 closed to admission of steam at short cut-offs used at high locomotive speeds, and exhausts steam at all practicable cut-offs and speeds, this action being advantageous especially at the higher speeds and short cut-offs, keeping the exhaust open after the main valve has cut off its exhaust.

The operation of our improved valve mechanism is illustrated graphically in Figures 9 to 14 inclusive, which show diagrammatic views of the improved valve mechanism and locomotive valve gearing shown in Figures 1 to 8 inclusive. Figures 9 to 12 inclusive illustrate the operation of our improved valve mechanism with the valve gearing in full gear, that is, adjusted so that the valves A and B have maximum travel for low locomotive speeds and in starting. Figures 13 and 14 illustrate the operation at 25 per cent cut-off.

As shown in Figure 9, with the crank pin 18 of the drive wheel 13 at front dead center, and the piston 63 at the front end of its stroke, the main valve A is in position to open slightly the front port 56, which leads to the front end of the cylinder 10 to admit steam, and completely open the rear port 56 to exhaust steam from the other end of the cylinder, and the auxiliary valve B is in position closing both the front and rear ports 60—60 which communicate directly with the steam passages 41 and 42 leading to the cylinder and independently of the ports 56—56, as hereinbefore described. Steam is thus admitted to the cylinder 10 in front of the piston to move the latter to the position shown in Figure 10. During this movement of the piston, the main and auxiliary valves A and B are moved to the positions shown in Figure 10, the front port 56 of the main valve chamber being opened to a greater extent by the valve A and the rear port 60 of the auxiliary valve chamber being partly opened by the auxiliary valve B to exhaust steam from the cylinder 10. The capacity of the exhaust of the valve mechanism is thus increased, the exhausting action of the auxiliary valve B being independent of, and in addition to, that of the main valve A, the rear port 60 communicating with the cylinder 10 independently of the rear port 56, as hereinbefore stated.

As steam continues to be admitted to the cylinder 10, the piston 63 moves from the position shown in Figure 10 toward that shown in Figure 11, thereby moving the crank pin 18 and the main and auxiliary valves A and B to the respective positions shown in said last named figure, the front port 56 of the main valve chamber being closed by the main valve A to cut off the steam admitted to the cylinder 10 and the front port 60 of the auxiliary valve chamber remaining open to continue admission of steam to the cylinder 10 in front of the piston 63. As will be evident, the admission of steam to actuate the piston is thus materially prolonged to facilitate starting of the locomotive and operation thereof at low speed. As will be noted, when the main and auxiliary valves A and B are in the positions shown in Figure 11, the rear port 56 of the main valve chamber is beginning to be closed by the main valve and the rear port 60 of the auxiliary valve chamber is fully opened by the valve B. The exhaust of steam thus continues with the parts in the position shown in Figure 11.

As the piston 63 travels rearwardly in the cylinder 10, from the position shown in Figure 11 to that shown in Figure 12, the main valve A completely closes both ports 56—56 of the main valve chamber, as shown in Figure 12, and the auxiliary valve B has cut off the steam to the cylinder 10 by closing the front port 60 of the auxiliary valve chamber. At this time the rear port 60 is still open to continue the exhaust of steam by means of the auxiliary valve B.

Upon the crank 18 reaching its rear dead center position, with the piston 63 at the extreme rear end of the stroke, the cycle of operations described is repeated with the exception that the motions of the parts are reversed, that is, that the steam is admitted to the rear of the piston, instead of in front of the same, and exhausted from the front end of the cylinder 10, instead of from the rear end thereof. In other words, the rear dead center position of the parts is substantially the reverse of that shown in Figure 9, the piston 63 being at the rear end of the stroke, the main valve A opening the rear port 56 for admission of steam to the cylinder 10 and leaving the front port 56 open for exhaust, and the auxiliary valve B closing the front and rear ports 60—60.

With the valve gearing set at 25 per cent cut-off, as illustrated in Figures 13 and 14, that is, early cut-off for high locomotive speeds, the travel of the auxiliary valve B is insufficient to uncover the ports 60—60 of the auxiliary valve chamber to admit steam to the engine cylinder 10, however, exhaust action is produced by the auxiliary valve B and continues after the exhaust has been cut off through the main valve A. A 25 per cent cut-off, as shown in Figure 13, with the piston 63 traveling in forward direction and the crank 18 in the position shown, the front port 60 of the auxiliary valve chamber is open to exhaust steam from the cylinder 10, while the front port 56 of the main valve chamber has been completely closed by the main valve A. The exhaust action is thus prolonged, beyond the exhaust cut-off of the main valve, by means of the auxiliary valve, thereby reducing compression at high locomotive speeds and materially increasing the efficiency of the engine.

Upon movement of the piston 63 forwardly from the position shown in Figure 13 to that shown in Figure 14, the main valve A has opened the port 56 to exhaust steam from the rear end of the cylinder 10 and the auxiliary valve B has completely closed the front port 60 of the auxiliary valve chamber to cut off exhaust from the front of the cylinder 10.

Referring next to the embodiment of the invention illustrated in Figure 17, our improved mechanism is substantially the same as that hereinbefore described in connection with Figures 1 to 16 inclusive, with the exception that it is particularly designed for use with the well-known "Baker" valve gear, instead of the "Walschaert."

The locomotive illustrated in Figure 17 comprises the following elements, all similar to the corresponding elements shown in Figure 1 and indicated by the same reference characters: steam cylinder 10, steam chest 11, driving wheels 12 and 13, leading truck wheels 14, main rod 15, piston rod 17, main crank pin 18 on the wheel 13, side rods 19—19, crosshead wrist pin 22, valve stem 24 of the main distributing valve A, guide 67 for the valve stem 24, union link 25, eccentric rod 34, eccentric crank 35, and eccentric crank pin 36.

The steam chest 11 includes the valve chambers for the main and auxiliary distributing valves A and B hereinbefore described, the main valve chamber being indicated by 81 and the auxiliary valve chamber by 82. The piston rod 17 carries a crosshead 83 of well-known design at the inner end thereof, which is slidable between top and bottom crosshead guides 84—84.

The "Baker" type of valve gearing, with which our improvements shown in Figure 17 are employed, comprises broadly the following well-known elements: a combination lever 85 pivotally connected at its lower end to the front end of the union link 25 and pivotally connected near its upper end to the usual crosshead 24ª attached to the valve stem 24 of the main valve, and having its upper end projecting upwardly beyond its pivotal connection with the valve stem 24; a bell crank member 86 swingingly supported in a gear bracket frame 87 and having the usual depending arm 88 and rearwardly extending arm 89; a transmission rod 90 pivotally connected at its front and rear ends respectively to the projecting upper end of the combination lever 85 and the lower extremity of the arm 88 of the bell crank; a reverse yoke 91 swingingly supported at its lower end in the bracket 87; radius bars or links 92 pivotally hung at their upper ends in the yoke 91, as indicated at 93; a gear connecting rod 94 journaled between its ends on the lower ends of the links 92 and having its upper and lower ends pivotally connected, respectively, to the rearwardly projecting arm 89 of the bell crank, and the front end of the eccentric rod 34; a reverse shaft 95 which is operated in the usual manner to adjust the valve gearing for different cut-offs and for reversal of the locomotive; a lever arm 96 carried by the shaft 95; and a rod 98 pivoted at its front end to the yoke and at its rear end to the upper end of the lever arm 96. The main valve is actuated by the combination lever 85, the movements of which are jointly produced by the motion of the crosshead 83 through the connecting or union link 25, and eccentric crank 35 through the connections comprising the eccentric rod 34, connecting rod 94, bell crank 86, and transmission rod 90, controlled by the setting of the reverse yoke 91.

In carrying out our invention, as illustrated in Figure 17, the transmission rod is provided with an upwardly projecting short arm 99 at the front end thereof, the arm 99 being substantially at a right angle to the length of the transmission rod and extending from the pivotal connection of said rod with the combination lever 85. The upper end of the arm 99 is connected to the valve stem 100 of the auxiliary valve B by a short link 101 pivotally connected at its front and rear ends, respective, to the outer end of the valve stem 100 and the upper end of the arm 99.

The operation of the main and auxiliary distributing valves A and B, as actuated by the means shown in Figure 17 employed in connection with the "Baker" valve gear, is substantially the same as that hereinbefore described in connection with Figures 9 to 14 inclusive, the main valve A being actuated by the combination lever 85 in the usual manner, and the auxiliary valve B being actuated in proper timed relation therewith by the transmission rod 90, by the provision of the angular arm 99 on the transmission rod and the link 101, which is pivotally connected at its opposite ends to the rear end of the stem of the auxiliary valve and the upper end of the arm 99.

Referring next to the embodiment of the invention illustrated in Figures 18, 19, and 20, the construction and arrangement is similar to that described in connection with Figures 1 to 17 inclusive, with the exception that the auxiliary valve chamber is arranged alongside, that is, on the inner side of the main valve chamber, instead of above the same, and that the mechanism for actuating the auxiliary valve is accordingly modified.

As shown in Figures 18, 19, and 20, the main distributing valve is actuated by the combination lever of the valve gear which corresponds to the combination lever of the "Walschaert" valve gear in Figure 1 and is also indicated by 23, and the auxiliary distributing valve is actuated by the radius rod 26 of the "Walschaert" valve gear, or by the transmission rod 90 of the "Baker" valve gear.

The steam chest portion only of the cylinder casting of the locomotive is shown in Figures 18, 19, and 20. The steam chest is indicated by 102 in these figures and its construction and design differs from that of the steam chest 11 shown in Figures 1 to 8 inclusive only in that it is formed in such a manner that the valve chambers for the main and auxiliary distributing valves may be arranged side by side, instead of one above the other. The valve chamber for the main distributing valve is closed at its rear end by the usual head 104 provided with a stuffing box 105 through which the valve stem 106 of the main distributing valve extends. The main distributing valve and the parts with which it cooperates are identical with the main distributing valve A and cooperating parts hereinbefore described. The valve stem 106 is slidingly supported at its outer end on a valve stem guide 107 formed integral with the head 104 and identical with the guide 67 hereinbefore described, with the exception that the guide 107 is provided with a supporting bracket 108 depending from the underneath side thereof, which supporting bracket is located between the ends of said guide bracket 107. The combination lever 23 is pivotally connected near its upper end to the crosshead 106a attached to the stem 106, as indicated at 109. The radius rod 26 is pivotally connected to the upper end of the combination lever 23 by a pivot pin 110. The rod 26 is forked at its front end, as indicated at 111, said forked end embracing the upper end of the combination lever 23 and having the pivot pin 110 extending through the arms thereof. The fork 111 is extended forwardly beyond the pivotal connection thereof with the lever 23.

The valve chamber for the auxiliary distributing valve corresponds to the valve chamber of the valve B hereinbefore described and is located at one side of the chamber for the main distributing valve. A head 112 closes the rear end of the auxiliary valve chamber, said head being provided with a stuffing box 113 through which the stem 114 of the auxiliary distributing valve B extends. The auxiliary distributing valve B and its valve chamber are of smaller diameter or size than the corresponding main distributing valve A and its chamber. As illustrated in Figure 20, the auxiliary valve chamber is located to the left of the chamber for the main distributing valve A, that is, the central longitudinal axis of the chamber for the auxiliary valve B is to the left and slightly above the central longitudinal axis of the chamber for the main valve. Figures 18, 19, and 20 illustrate the right side of the locomotive. The left side is similarly constructed.

The valve stem 114 of the auxiliary valve B is operated from the radius rod 26 by the following mechanism: a rocker 115 connected to the rod 26 by a link 116 and to the valve stem 114 by a link 117. The rocker 115 comprises a cylindrical sleeve portion 118 having upstanding arms 119 and 120 at opposite ends thereof. The sleeve 118 is rotatably journaled on a horizontally disposed, supporting shaft 121 having its opposite ends supported in the bracket 108 on the valve guide 107 and a socket member 122 fixed to the frame structure of the locomotive. The rocker 115 is held against endwise movement on the shaft 121 by collars 123 and 124, the collar 123 being interposed between the bracket 108 and the corresponding end of the sleeve 118, and the collar 124 engaging the opposite end of the sleeve and being fixed to the shaft by a suitable set screw.

The link 117 is in the form of a short bar forked at its front and rear ends, as indicated at 125 and 126. The fork 125 embraces the rear end portion of the valve stem 114, which rear end portion is reduced in thickness, as indicated at 127, and is connected thereto by a pivot pin extending through the arms of the fork and said reduced end 12. The fork 126 at the rear end of the link 117 embraces the upper end of the arm 120 of the rocker and is connected thereto by a suitable pivot pin extending through the arms of the fork and said lever. The arm 119 of the rocker 115 is laterally offset at its upper end, as indicated at 131, to overhang the guide bracket 107. The link 116 which connects the radius rod 26 to the rocker 115 is forked at the front end, as indicated at 128, the arms of said fork 128 embracing the offset upper end of the lever arm 119 of the rocker and being connected thereto by a suitable pivot pin extending through said fork and the upper end of the lever arm 119. The rear end of the link 116 is provided with a laterally enlarged headlike portion 129 which is embraced by the projecting portion of the fork 111 of the radius rod 26 and is connected to said rod by a suitable pivot pin 130 extending through the arm of the fork and the head 129.

The operation of the mechanism illustrated in Figures 18, 19, and 20 is as follows: Motion is imparted to the combination lever 23 jointly by the union link of the valve gearing and the radius rod 26 to actuate the main distributing valve A, and the forward and backward movement of the radius rod 26 is transmitted through the link 116, rocker 115, and link 117 to the valve stem 114 of the auxiliary distributing valve B to actuate the latter, the link 116 actuating the arm 119 of the rocker to rock the same and the arm 120 of the rocker actuating the link 117 to slide the valve stem 114.

We have herein shown and described what we now consider the preferred manner of carrying out our invention, but the same is merely illustrative and we contemplate all changes and modifications that come within the scope of the claims appended hereto.

We claim:

1. In a locomotive comprising a cylinder and a piston operating in said cylinder, the combination with a main distributing valve for admitting steam to and exhausting steam from said cylinder; of an auxiliary distributing valve admitting steam to and exhausting steam from said cylinder independently of said main valve; and a valve gear actuated by said piston for operating said main and auxiliary valves.

2. In a locomotive comprising a cylinder, a piston operating in said cylinder, and a crank shaft driven by said piston, the combination with a main distributing slide valve admitting steam to and exhausting steam from said cylinder; of an auxiliary distributing slide valve admitting steam to and exhausting steam from said cylinder independently of said main valve; and a valve gear driven from said crank shaft for actuating said auxiliary valve.

3. In a locomotive comprising a cylinder, a piston operating in said cylinder, a sliding crosshead actuated by said piston, and a crank shaft driven by said piston through a main rod connecting the crank shaft to the crosshead, the combination with a main distributing slide valve admitting steam to and exhausting steam from said cylinder; of an auxiliary distributing slide valve admitting steam to and exhausting steam from said cylinder; and a valve gear including a reciprocating rod actuated from said crank shaft and directly actuating said auxiliary valve, and a combination lever actuated by said crosshead and rod and actuating said main valve.

4. In a locomotive comprising a cylinder and a piston operating in said cylinder, the combination with a main distributing valve admitting steam to and exhausting steam from said cylinder; of an auxiliary distributing valve admitting steam to and exhausting steam from said cylinder; and a valve gear actuated by said piston actuating said auxiliary and main valves to prevent admission of steam to said cylinder through said auxiliary valve at short cut-off of the valve gear, and prolong exhaust of steam from said cylinder through said auxiliary valve after the exhaust from the cylinder through said main valve has been cut off.

5. In a locomotive comprising a cylinder, a piston operating in the cylinder, a sliding crosshead actuated by said piston, a crank shaft actuated from said crosshead, and an eccentric crank rotatable with said first named crank, the combination with a main valve chamber having a steam port communicating with said cylinder; of a main distributing valve slidable in said main valve chamber and cooperating with said port, said main valve having steam lap; an auxiliary valve chamber having a steam port communicating with said cylinder independently of the port of the main valve chamber; an auxiliary distributing valve slidable in said auxiliary valve chamber and cooperating with the port thereof, said auxiliary valve having both steam and exhaust lap; and a valve gear including a member actuated by movement of said eccentric crank, and an element actuated jointly by said crosshead and member, said element actuating the main distributing valve to admit and exhaust steam through the port of said main valve chamber, and said member actuating the auxiliary valve independently of said main valve for prolonging both the admission and exhaust of steam through the port of said auxiliary valve after the main valve has cut off admission and exhaust through the port of said main valve chamber.

6. In a locomotive comprising a cylinder and a piston operating in said cylinder, the combination with a main valve chamber having a steam port communicating with the cylinder; of a main distributing valve slidable in said chamber and cooperating with said port, said valve having steam lap; an auxiliary valve chamber having a steam port and an exhaust outlet, said steam port communicating with said cylinder independently of said first named port; an auxiliary distributing valve slidable in said auxiliary valve chamber and cooperating with said port, said auxiliary valve having both steam and exhaust lap for preventing admission of steam by said auxiliary valve at short cut offs and controlling exhaust of said auxiliary valve; and a valve gear actuated by said piston for operating said main and auxiliary valves.

7. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve for admitting steam to and exhausting steam from said cylinder; of an auxiliary distributing valve admitting steam to and exhausting steam from said cylinder independently of said main valve; and a valve gear including a member actuated by movement of said eccentric crank and an element actuated jointly by said crosshead and member, said element being connected to said main distributing valve to actuate the same, and said member being connected to the auxiliary valve for actuating the same.

8. In a locomotive comprising a cylinder, a piston operating in the cylinder, a sliding crosshead actuated by said piston, a crank shaft actuated from said crosshead, and an eccentric crank rotatable with said first named crank, the combination with a main valve chamber having a steam port communicating with said cylinder; of a main distributing valve slidable in said main valve chamber and cooperating with said port to admit and exhaust steam therethrough; an auxiliary valve chamber having a steam port communicating with said cylinder independently of the port of the main valve chamber; an auxiliary distributing valve slidable in said auxiliary valve chamber and cooperating with said auxiliary valve port to admit and exhaust steam; and a valve gear including a member actuated by movement of said eccentric crank, an element actuated jointly by said crosshead and member, and controlling means for adjusting movement of said member to control the cut-off of the main and auxiliary valves, said element being connected to the main valve to actuate the same, and said member being connected to the auxiliary valve to actuate the same independently of the operation of said main valve.

9. In a locomotive comprising a cylinder, a piston operating in the cylinder, a sliding crosshead actuated by the piston, a crank shaft actuated from said crosshead, and a second crank eccentric to said first crank, the combination with a main distributing valve for admitting steam to and exhausting steam from said cylinder; of an auxiliary distributing valve for admitting steam to and exhausting steam from said cylinder; means connecting said second named crank and auxiliary valve for actuating the same; and means connecting said main valve with said first named means and the crosshead for actuating the main valve.

10. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber above said main valve chamber and having a steam port communicating with said cylinder independently of said port of the main valve chamber; an auxiliary valve slidable in said auxiliary valve chamber; a vertically disposed combination lever operatively connected at its lower end to said crosshead for movement therewith, said lever being connected between its ends to the main valve to actuate the same; a rod receiving reciprocating motion from said eccentric crank and pivotally connected to the upper end of the combination lever to actuate the same; a valve stem on said auxiliary valve; means for guiding said stem for horizontal movement; a depending arm on said stem; and a link connecting the lower end of said arm of said valve stem to said rod, said link being pivotally connected directly to said rod at a point forwardly of the pivotal connection thereof with the combination lever.

11. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber above said main valve chamber and having a steam port communicating with said cylinder independently of said port of the main valve chamber; an auxiliary valve slidable in said auxiliary valve chamber; a vertically disposed combination lever operatively connected at its lower end to said crosshead for movement therewith, said lever being connected between its ends to the main valve to actuate the same; a transmission rod receiving motion from said eccentric crank and pivotally connected to the upper end of the combination lever to actuate the same; driving means connecting said transmission rod and auxiliary valve to actuate the latter, said rod having an upstanding arm at the pivotal connection thereof with the combination lever; a valve stem on said auxiliary valve; and a link pivoted at opposite ends to the outer end of said valve stem and the upper end of said arm for pivotally connecting the valve stem and radius rod.

12. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber at the side of said main valve chamber and having a steam port communicating with said cylinder independently of said port of the main valve chamber; an auxiliary valve slidable in said auxiliary valve chamber; a vertically disposed combination lever operatively connected at its lower end to said crosshead for movement therewith, said lever being connected between its ends to the main valve to actuate the same; a rod actuated by said eccentric crank and pivotally connected to the upper end of the combination lever to actuate the same; a valve stem on said auxiliary valve; and driving means operatively connecting said rod and auxiliary valve stem including a rocker swingingly supported on the locomotive and having upstanding laterally spaced arms, a link connecting the upper end of one of said arms to said valve stem, and a link connecting the upper end of the other arm to the front end of the said rod.

13. In a locomotive comprising a cylinder and a piston operating in said cylinder, the combination with a main distributing valve chamber having a steam passage communicating with the source of steam supply, an exhaust passage communicating with the exhaust outlet of the locomotive, and a steam port communicating with the cylinder; of a main distributing valve slidable in said valve chamber and cooperating with said port and steam and exhaust passages; an auxiliary valve chamber having a steam passage communicating with the source of steam supply independently of said main valve chamber, an exhaust passage communicating with the exhaust outlet independently of said main valve chamber, and a steam port communicating with the cylinder independently of said main valve chamber; an auxiliary distributing valve slidable in said auxiliary valve chamber and cooperating with the port and steam and exhaust passages of said auxiliary valve chamber; and a valve gear actuated by said piston for actuating said main and auxiliary valves.

14. In a locomotive comprising a cylinder, a piston operating in said cylinder, and a valve gear actuated through movement of said piston, said valve gear being adjustable to provide different cut-offs, the combination with a main valve chamber having a steam port at one end and a second steam port at the other end, said ports communicating with respectively opposite ends of the cylinder; of an auxiliary valve chamber having a steam port at the end thereof corresponding to the end of the main valve chamber which has said first named port, communicating with said cylinder independently of said main valve chamber, said auxiliary valve chamber at the other end thereof having a second steam port communicating directly with the cylinder independently of said main valve chamber; main and auxiliary steam distributing valves slidable in said main and auxiliary valve chambers, respectively, and cooperating with the steam ports thereof; and means for relatively moving said main and auxiliary valves by said valve gear at long cut-offs to first open said first and second ports of said main valve chamber, to admit and exhaust steam respectively, then open said second port of the auxiliary valve chamber to exhaust steam, then open said first port of the auxiliary valve chamber to admit steam, then close the first port of the main valve chamber to cut-off the steam, then close said second port of the main valve chamber and first port of the auxiliary valve chamber to cut-off the exhaust and admission of steam respectively, and then close said second named port of the auxiliary valve chamber to cut-off the exhaust, and at short cut-offs to first open said first and second ports of the main valve chamber to admit and exhaust steam respectively, then open said second named port of the auxiliary valve chamber to exhaust steam, then close said first port of the main valve chamber to cut-off admission of steam, then close said second port of the main valve chamber to cut-off the exhaust, and then close said second port of the auxiliary valve chamber to cut-off the exhaust.

15. In a locomotive comprising a cylinder, a piston operating in the cylinder, a sliding crosshead actuated by the piston, a crank shaft actuated by means of a connecting rod journaled to said crosshead, an eccentric member on said crank shaft, the combination with a main distributing valve for admitting steam to and exhausting steam from said cylinder; of an auxiliary distributing valve for admitting steam to and exhausting steam from said cylinder; and means for actuating said main valve in timed relationship to rotation of said crank shaft, said means also actuating auxiliary valve in a timed relationship of approximately 90 phase degrees to rotation of crank shaft, motion of said auxiliary valve being reversible or altered 180 degrees of phase relationship to said crank shaft by said means, whereby motion of said main valve is reversed or altered 180 degrees of phase relationship.

16. In a locomotive comprising a cylinder, a piston operating in said cylinder, a sliding crosshead actuated by said piston, a crank shaft actuated from said crosshead, and an eccentric crank rotatable with said crank shaft, the combination with a main valve chamber having a steam port communicating with a passage leading to said cylinder; of a main distributing valve sliding in said main valve chamber; valve gearing actuated by said eccentric crank and said crosshead; an auxiliary valve chamber having a steam port and an exhaust opening, said steam port communicating with said passage independently of said port of the main valve chamber; and an auxiliary distributing valve sliding in said auxiliary valve chamber cooperating with the steam port of said auxiliary valve chamber to admit and exhaust steam, said auxiliary distributing valve being actuated by said valve gearing for prolonging admission of steam to the cylinder through the port of said auxiliary valve after the main valve has closed the port of the main valve chamber and exhausting steam from said cylinder.

17. In a locomotive comprising a cylinder, a piston operating in said cylinder, a sliding crosshead actuated by said piston, a crank actuated from said crosshead, and an eccentric crank rotatable with said first named crank, the combination with a main valve chamber having a steam port communicating with a passage leading to said cylinder; of a main distributing valve slidable in said main valve chamber; an auxiliary valve chamber having an exhaust outlet, and a steam port communicating with said passage independently of the main valve chamber; an auxiliary distributing valve slidable in said auxiliary valve chamber for admitting and exhausting steam; and a valve gear actuated by movement of said eccentric crank and said crosshead, said valve gear being operatively connected to said main distributing valve to actuate the same, and said auxiliary valve being actuated by said valve gear for prolonging admission of steam to the cylinder through the port of said auxiliary valve after the main valve has closed the port of the main valve chamber.

18. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber having a steam port communicating with said cylinder; a main distributing valve slidable in said valve chamber and cooperating with said port; an auxiliary valve chamber having a steam port communicating with said cylinder independently of said port of the main valve chamber; an auxiliary valve slidable in said auxiliary valve chamber and cooperating with the steam port of said auxiliary valve chamber to admit and exhaust steam; a vertically disposed combination lever operatively connected at its lower end to said crosshead for movement therewith, said lever being connected between its ends to the main valve to actuate the same; a rod receiving reciprocating motion from said eccentric crank and pivotally connected to the upper end of the combination lever to actuate the same; and driving means between said rod and auxiliary valve to actuate the latter, said driving means being directly connected to said rod for movement in unison therewith.

19. In a locomotive comprising a cylinder, a piston operating in said cylinder, a sliding crosshead actuated by said piston, a crank shaft actuated from said cross-head, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber above said main valve chamber and having a steam port communicating with said cylinder independently of said port of the main valve chamber; an auxiliary valve slidable in said auxiliary valve chamber and cooperating with said steam port of said auxiliary valve chamber to admit and exhaust steam; a vertically disposed combination lever operatively connected at its lower end to said crosshead for movement therewith, said lever being connected between its ends to the main valve to actuate the same; a transmission rod receiving motion from said eccentric crank and pivotally connected to the upper end of the combination lever to actuate the same; and driving means connecting said transmission rod and auxiliary valve to actuate the latter, said driving means being directly connected to the transmission rod for movement in unison therewith, said connection of said driving means with said transmission rod being eccentric to the pivotal connection of said rod with said combination lever.

20. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber having a steam port communicating with said cylinder; a main distributing valve slidable in said valve chamber and cooperating with said port; an auxiliary valve chamber having a steam port communicating with said cylinder independently of said port of the main valve chamber; an auxiliary valve slidable in said auxiliary valve chamber and cooperating with said steam port of said auxiliary valve chamber to admit and exhaust steam; a vertically disposed combination lever operatively connected at its lower end to said crosshead for movement therewith, said lever being connected between its ends to the main valve to actuate the same; a transmission rod receiving motion from said eccentric crank and pivotally connected to the upper end of the combination lever to actuate the same; and driving means connecting said transmission rod and auxiliary valve to actuate the latter, said driving means being directly connected to the transmission rod for movement in unison therewith, said connection of said driving means with said transmission rod being eccentric to the pivotal connection of said rod with said combination lever.

21. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber above said main valve chamber and having a steam port communicating with said cylinder independently of said port of the main valve chamber; an auxiliary valve slidable in said auxiliary valve chamber and cooperating with said steam port of said auxiliary valve chamber to admit and exhaust steam; a vertically disposed combination lever operatively connected at its lower end to said crosshead for movement therewith, said lever being connected between its ends to the main valve to actuate the same; a rod receiving reciprocating motion from said eccentric crank and pivotally connected to the upper end of the combination lever to actuate the same; a valve stem on said auxiliary valve; means for guiding said stem for horizontal movement; and a link connecting said valve stem to said rod, said link being pivotally connected directly to said rod at a point forwardly of the pivotal connection thereof with the combination lever.

22. In a locomotive comprising a cylinder, a piston operating in said cylinder, a sliding crosshead actuated by said piston, a crank shaft actuated from said crosshead, and an eccentric crank rotatable with said first named crank, the combination with a main distributing valve chamber above said cylinder and having a steam port communicating with said cylinder; a main distributing valve slidable in said valve chamber and cooperating with said port; an auxiliary valve chamber above said main valve chamber and having a steam port communicating with said cylinder independently of said port of the main valve chamber; an auxiliary valve slidable in said auxiliary valve chamber and cooperating with said steam port of said auxiliary valve chamber to admit and exhaust steam; a vertically disposed combination lever operatively connected at its lower end to said crosshead for movement therewith, said lever being connected between its ends to the main valve to actuate the same; a transmission rod receiving motion from said eccentric crank and pivotally connected to the upper end of the combination lever to actuate the same; driving means connecting said transmission rod and auxiliary valve to actuate the latter, said rod having an upstanding arm at the pivotal connection thereof with the combination lever; a valve stem on said auxiliary valve; and a link pivoted at opposite ends to the outer end of said valve stem and the upper end of said arm for pivotally connecting the valve stem and radius rod.

23. In a locomotive comprising a cylinder, a piston operating in said cylinder, and a valve gear actuated by said piston, the combination with a main distributing valve chamber above said cylinder and having a steam port communicating with said cylinder; a main distributing valve slidable in said valve chamber and cooperating with said port, said valve being actuated by the valve gear; an auxiliary valve chamber at the side of said main valve chamber and having a steam port communicating with said cylinder independently of the main valve chamber; an auxiliary valve slidable in said auxiliary valve chamber; a valve stem on said auxiliary valve; and driving means operatively connecting said valve stem to the valve gear including a rocker swingingly supported on the locomotive and having laterally spaced arms, said arms projecting in the same direction, a link connecting one of said arms to the valve stem, and a second link connecting the other arm to said valve gear.

24. In a locomotive comprising a cylinder, a piston operating in said cylinder, and a sliding crosshead actuated by said piston, the combination with a main distributing valve for admitting steam to and exhausting steam from said cylinder; of an auxiliary distributing valve exhausting steam from said cylinder independently of said main valve; a valve stem fixed to said auxiliary valve; and a valve gear actuated by said piston for operating said main and auxiliary valves; said valve gear including a combination lever, pivotally connected between its ends to said main valve and at its lower end to said crosshead for movement therewith, a crank actuated from said crosshead, an eccentric crank rotatable with said first named crank, a rod receiving motion from said eccentric crank and pivotally connected to the combination lever, said rod being directly connected to said stem of the auxiliary valve for actuating the same.

ROBERT R. ROYAL.
WILLIAM E. BELL.

REFERENCES CITED

The following references are of record in the file of this patent:

UNITED STATES PATENTS

| Number | Name | Date |
|---|---|---|
| 309,592 | Westinghouse | Dec. 23, 1884 |
| 770,671 | Allfree | Sept. 20, 1904 |
| 922,036 | Prescott | May 18, 1909 |
| 1,032,039 | Allfree | July 9, 1912 |
| 1,724,145 | Reed | Aug. 13, 1929 |
| 1,877,893 | Knight | Sept. 20, 1932 |
| 1,942,369 | Doughty | Jan. 2, 1934 |
| 2,034,271 | Roberts | Mar. 17, 1936 |
| 2,074,165 | Clark | Mar. 16, 1937 |

FOREIGN PATENTS

| Number | Country | Date |
|---|---|---|
| 534,400 | Germany | Sept. 25, 1931 |